US010956745B2

(12) United States Patent
Herring et al.

(10) Patent No.: US 10,956,745 B2
(45) Date of Patent: Mar. 23, 2021

(54) SYSTEM AND METHOD FOR LINKING SALES ASSOCIATES TO CUSTOMER

(71) Applicant: Toshiba Global Commerce Solutions Holdings Corporation, Tokyo (JP)

(72) Inventors: Dean Frederick Herring, Youngsville, NC (US); Susan W. Brosnan, Raleigh, NC (US); Adrian X. Rodriguez, Durham, NC (US)

(73) Assignee: Toshiba Global Commerce Solutions, Tokyo (JP)

( * ) Notice: Subject to any disclaimer, the term of this patent is extended or adjusted under 35 U.S.C. 154(b) by 74 days.

(21) Appl. No.: 16/369,292

(22) Filed: Mar. 29, 2019

(65) Prior Publication Data
US 2020/0311430 A1 Oct. 1, 2020

(51) Int. Cl.
G06K 9/00 (2006.01)
G06Q 10/06 (2012.01)
G06T 7/20 (2017.01)

(52) U.S. Cl.
CPC ...... *G06K 9/00711* (2013.01); *G06K 9/00288* (2013.01); *G06Q 10/063* (2013.01); *G06T 7/20* (2013.01); *G06K 2009/00738* (2013.01)

(58) Field of Classification Search
CPC .......... G06Q 30/0238; G06Q 10/063; G07F 19/207; G06T 2207/10016; G06T 2207/30232; G06T 7/00
See application file for complete search history.

(56) References Cited

U.S. PATENT DOCUMENTS

| | | | | |
|---|---|---|---|---|
| 7,267,277 | B2 * | 9/2007 | Apte | G06Q 20/20 235/454 |
| 7,433,855 | B2 * | 10/2008 | Gavan | H04J 3/175 379/111 |
| 7,617,981 | B2 * | 11/2009 | Apte | G06Q 20/20 235/454 |
| 7,631,808 | B2 * | 12/2009 | Kundu | G06Q 20/00 235/383 |
| 7,707,089 | B1 * | 4/2010 | Barton | G06Q 20/105 705/35 |
| 7,908,159 | B1 * | 3/2011 | Ordonez | G06Q 10/063 705/7.33 |
| 8,010,402 | B1 * | 8/2011 | Sharma | G06Q 10/00 705/7.29 |

(Continued)

OTHER PUBLICATIONS

Howland, D., "Humans in Retail: The Importance of Store Associates in a Digital Age", Mar. 16, 2016, pp. 1-5, retrieved on Mar. 27, 2019, retrieved from internet: https://www.retaildive.com/news/humans-in-retail-the-importance-of-store-associates-in-a-digital-age/415416/.

(Continued)

*Primary Examiner* — Yosef Kassa
(74) *Attorney, Agent, or Firm* — Coats + Bennett, PLLC (57) ABSTRACT

A computer is configured to obtain a digital image (e.g., a video) of a customer in a retail store setting, and analyze the digital image to determine whether the customer was assisted with a particular sales transaction by one or more sales associates. If so, the computer identifies which particular sales associates assisted the customer based on the analysis, and links those sales associates to the customer's sales transaction. Such linking provides a basis for training tools, as well as for the accurate apportionment of a sales commission.

20 Claims, 8 Drawing Sheets

(56) References Cited

U.S. PATENT DOCUMENTS

| | | | | |
|---|---|---|---|---|
| 8,032,438 B1* | 10/2011 | Barton | ................. | G06Q 20/206 |
| | | | | 705/35 |
| 8,214,265 B2* | 7/2012 | Peters | ................. | G06Q 10/087 |
| | | | | 705/28 |
| 8,632,438 B2* | 1/2014 | Kuroda | ................. | B60L 3/0061 |
| | | | | 477/5 |
| 8,805,720 B2* | 8/2014 | Flake | ................. | G06Q 30/0224 |
| | | | | 705/14.25 |

OTHER PUBLICATIONS

Sutton, D., "Retail Marketing Transformation: The Use of Facial Recognition Technology", Jan. 10, 2019, pp. 1-4, retrieved on Mar. 27, 2019, retrieved from internet: https://www.business2community.com/business-innovation/retail-marketing-transformation-the-use-of-facial-recognition-technology-02158035.

\* cited by examiner

PROCESSING CIRCUITRY
130

DIGITAL IMAGE OBTAINING UNIT/MODULE
140

IMAGE ANALYSIS UNIT/MODULE
142

SALES ASSOCIATE DETERMINATION UNIT/MODULE
144

INTERACTION DETERMINATION UNIT/MODULE
146

IDENTITY DETERMINATION UNIT/MODULE
148

SALES TRANSACTION LINKING UNIT/MODULE
150

COMMISSION APPORTIONING UNIT/MODULE
152

FIG. 8

SYSTEM AND METHOD FOR LINKING SALES ASSOCIATES TO CUSTOMER

TECHNICAL FIELD

The present disclosure relates generally to computers for retail stores, and more particularly to computers that identify and link sales associates to customer transactions.

BACKGROUND

One of the benefits of shopping at a so-called "brick-n-mortar" establishment, such as a retail store, is the availability of sales associates. Besides having specific knowledge about a product, sales associates will often times work with customers to ensure they get the product they wish to purchase. Not only does this help the customer, but a sales associate's ability to ensure a smooth sales transaction process helps the owner of the retail store as well.

Typically, sales associates are compensated with a regular salary. However, in some cases, sales associates can also receive commissions on the sales transactions they help finalize. A commission is a form of variable compensation in which a sales associate is paid a predefined percentage of the sales price or revenue earned on a sales transaction connected to the sales associate, and can be awarded in lieu of, or in addition to, the sales associate's salary. There are various analytics and algorithms used to compute the amount of commission due to a sales associate. However, to receive a commission for a particular sales transaction, the sales associate must be properly linked to that sales transaction.

DETAILED DESCRIPTION

Embodiments of the present disclosure provide a computer, a method, and a corresponding non-transitory, computer-readable storage medium for accurately linking a sales associate that assisted a customer with a sales transaction to that sales transaction. Such linking is beneficial because it enables the computer systems of retail stores to better track the performance of the sales associates and provides various analytics that may be used for training purposes. Additionally, the ability to link sales associates to sales transactions facilitates the accurate computation of sales commissions. Thus, a computer configured to operate according to the present embodiments provides benefits and performs enhanced functions not performed by conventional computers.

For example, consider sales commissions. As stated above, a sales commission is a form of compensation in which a sales associate is paid a predefined percentage of the sales price or revenue earned on a sales transaction with which he or she is connected. To compute the sales commission for a sales associate, a computer for a retail system generally gathers information about the sales transactions connected to the sales associate. Such information may include, but is not limited to, data values describing the performance of the sale associate, the total dollar amount of sale(s) connected to the sales associate, and other order characteristics. Once collected, the computer computes the amount of the sales commission based on those data values.

Conventional methods of computing such sales commissions, however, are problematic because sales associate are not always properly connected to the sales transactions on which the commissions are based. Particularly, connecting any given sales associate to a given sale in a conventional system is done by "word-of-mouth" at a "point-of-sale" (POS) register. That is, when the customer finalizes a sales transaction at a POS register, a cashier asks the customer to identify the sales associate that helped them. If the customer knows or remembers the sales associate's name, that information can be input by the cashier into the POS system. Often times, however, the customer cannot remember the name of the person who helped them, or can provide only a vague description of the sales associate who assisted them. These vague descriptions can typically match many different sales associates, and thus, are generally not helpful. The end result is that either the wrong sales associate receives credit for the sales transaction, or no sales associate receives credit for the sales transaction. At any rate, the conventional method for linking a sales associate to a particular sales transaction takes time and delays the transaction process.

Embodiments of the present disclosure, however, address such issues by, inter alia, extending the existing infrastructure of a retail establishment to now link sales associates to sales transactions. In particular, the infrastructure of most retail establishments include video cameras. Although the cameras are used mainly for security purposes and/or for identifying customers as they enter or exit the store, embodiments of the present disclosure extend their use to help accurately link sales associates to corresponding sales transactions. That is, the cameras of a given retail store capture digital images (e.g., still images and/or video) of the personal interactions that occur between the sales associate and the customer as the customer moves through the retail store. A computer configured according to the present embodiments analyzes those digital images to determine if, in fact, a sales associate did interact personally with the customer. If so, the computer particularly identifies the sales associate and links the identified sales associate to that sales transaction. The information associated with the links can then be used as input for training purposes and apportioning sales commissions, for example.

Figure 1:
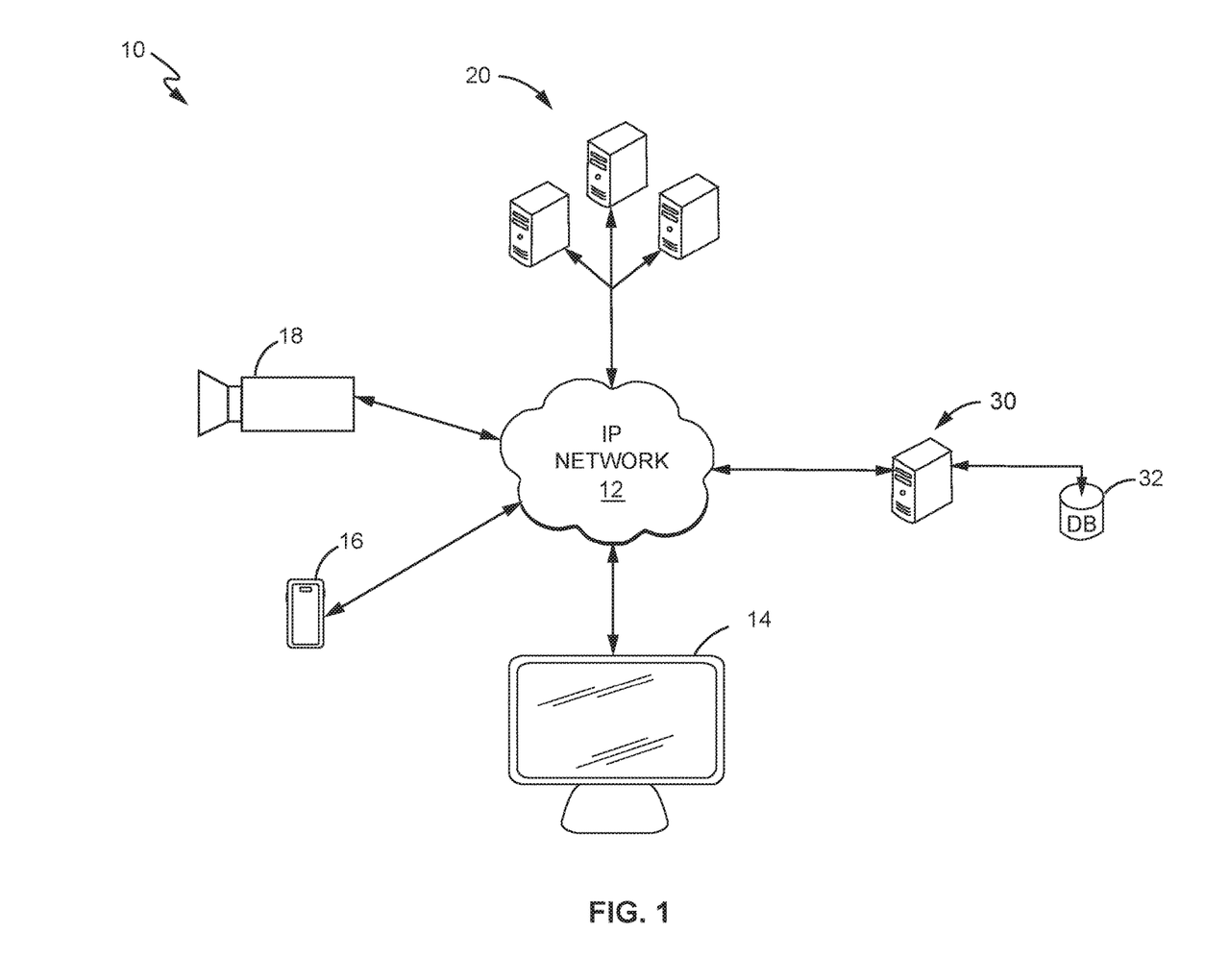
FIG. 1 is a functional block diagram of a system configured according to one embodiment of the present disclosure.

Turning now to the drawings, FIG. 1 is a functional block diagram illustrating a system 10 configured according to one embodiment of the present disclosure. As seen in FIG. 1, system 10 comprises a packet data network (i.e., IP network) 12 communicatively interconnecting a POS computer 14, one or more mobile devices 16, a plurality of video cameras 18, one or more third-party computer servers 20, and a control server 30 communicatively connected to a database 32.

The IP network 12 may comprise any private and/or public data network known in the art, such as the Internet, for example, but is capable of communicating packets of data utilizing the well-known Internet Protocol (IP). Such data includes, as described in more detail below, image data captured by the one or more cameras 18, as well as the commands, signals, and data required for control server 30 to perform it's functions.

POS computer 14 may comprise, or be a part of, any attendant-assisted checkout station known in the art. In general, a customer approaches POS computer 14 and provides the items he/she wishes to purchase to the attendant, such as a cashier. Using a scanner, the attendant scans the items and provides the customer with a total amount owed. The customer can then provide payment to the attendant for the items using cash, a credit card, or other payment vehicle.

As part of this process, the attendant may ask the customer whether any of the sales associates assisted them with their purchase. If the customer is able to definitively identify a sales associate that assisted with the sales transaction, the attendant can utilize the user interface for POS computer 14 to input the sales associate's name. If the customer cannot definitively identify a sales associate, which is often times the case, then POS computer 14 is configured to receive various search parameters from the attendant. According to one embodiment of the disclosure, the parameters are used in the performance of an image analysis on the one or more digital images captured by cameras 18. Such parameters may, for example, indicate a date and/or a time the customer may have interacted with the sales associate, a particular section of the retail store in which the customer may have interacted with the sales associate, one or more physical characteristics of the sales associate, an identifier on a badge worn by the sales associate, or any other identifier or indicator needed or desired. So provided, the POS computer 14 can obtain the digital images and perform the image analysis itself, or it can generate the commands and messages needed to control another computer, such as control server 30, to perform those functions.

Regardless of which computer performs the image analysis, however, the POS computer 14 can be provided with the results. The results may be displayed to the customer to aid the customer in identifying a particular sales associate that helped them with the sales transaction (when the results provide a plurality of possible choices of sales associates), or in verifying that a particular sales associate helped the customer with the sales transaction. So identified, the sales associates are then linked to the sales transaction.

It should be noted that POS computer 14 is described in these embodiments as being an attendant-assisted POS computer 14. However, as those of ordinary skill in the art will appreciate, the present embodiments are not so limited. Indeed, although not specifically shown herein, embodiments of the present disclosure are also suitable for implementation by a POS computer 14 associated with a self-checkout (SCO) station.

The mobile device 16 can comprise, for example, a smartphone or specialized POS mobile device carried by the sales associate. Generally, such devices may be utilized to scan items a customer may be interested in purchasing, and can be wirelessly connected to one or both of POS computer 14 and control server 30. In more detail, mobile device 16 can be utilized by a sales associate to query a server (e.g., control server 30) for information regarding items that may be available in-store, and to receive that information from the server in return. Once received, the sales associate can utilize that information to help the customer. For example, based on the returned information, the sales associate may walk the customer to a location in a section of the store where a desired item is located. In situations where the current store does not have any of the desired items on hand, the sales associate can identify a different store that does have the item in stock for the customer based on the returned information.

Cameras 18 may comprise any camera known in the art capable of capturing video imagery and/or still images, and then communicating those captured images to control server 30. For example, in one embodiment, cameras 18 comprise a network of security cameras already existing at the retail store. Used conventionally, cameras 18 output captured images to corresponding display devices where a human operator (e.g., a store employee) scans the images in real time. Alternatively, cameras 18 output the captured images to one or more recording devices for subsequent review by a human operator.

According to embodiments of the present disclosure, however, the functionality of cameras 18 is extended from typical security operation to identify sales associates that assist customers with sales transactions. Particularly, as described in more detail below, cameras 18 may be configured to capture digital images of a customer moving through the store. As the customer moves through the store, he/she may interact personally with one or more different sales associates who, along with the customer, will be captured by cameras 18 in the digital images. In some embodiments, markers are inserted into the digital images, or associated with the digital images, indicating where the sales associates may have interacted with the customers. These digital images are then analyzed at these markers and processed using any known algorithm or software package to determine whether any interactions occurred between the customer and the sales associate, and if so, the identity of the sales associate(s) that assisted the customer. Once identified, the sales associates can be linked to the sales transaction, as previously described. In one embodiment, facial recognition techniques are utilized to identify the sales associate.

The third-party computer servers 20 generally comprise one or more computer devices associated with various social networking sites. Such sites include, but are not limited to, those generally referred to FACEBOOK, TWITTER, and INSTAGRAM. As described in more detail later, one or more of these servers 20 are configured to send out notifications whenever the retail store (or employee, etc.) is "tagged" in a digital image posted to server 20. Responsive to receiving the notification, control server 30 can obtain the digital image for analysis, as previously described, detect interactions between the sales associate, identify the sales associate involved with the transaction, and link the sales associate to the sales transaction. In some embodiments of the present disclosure, control server 30 can be communicatively connected to a database (DB) 32.

Figure 2:
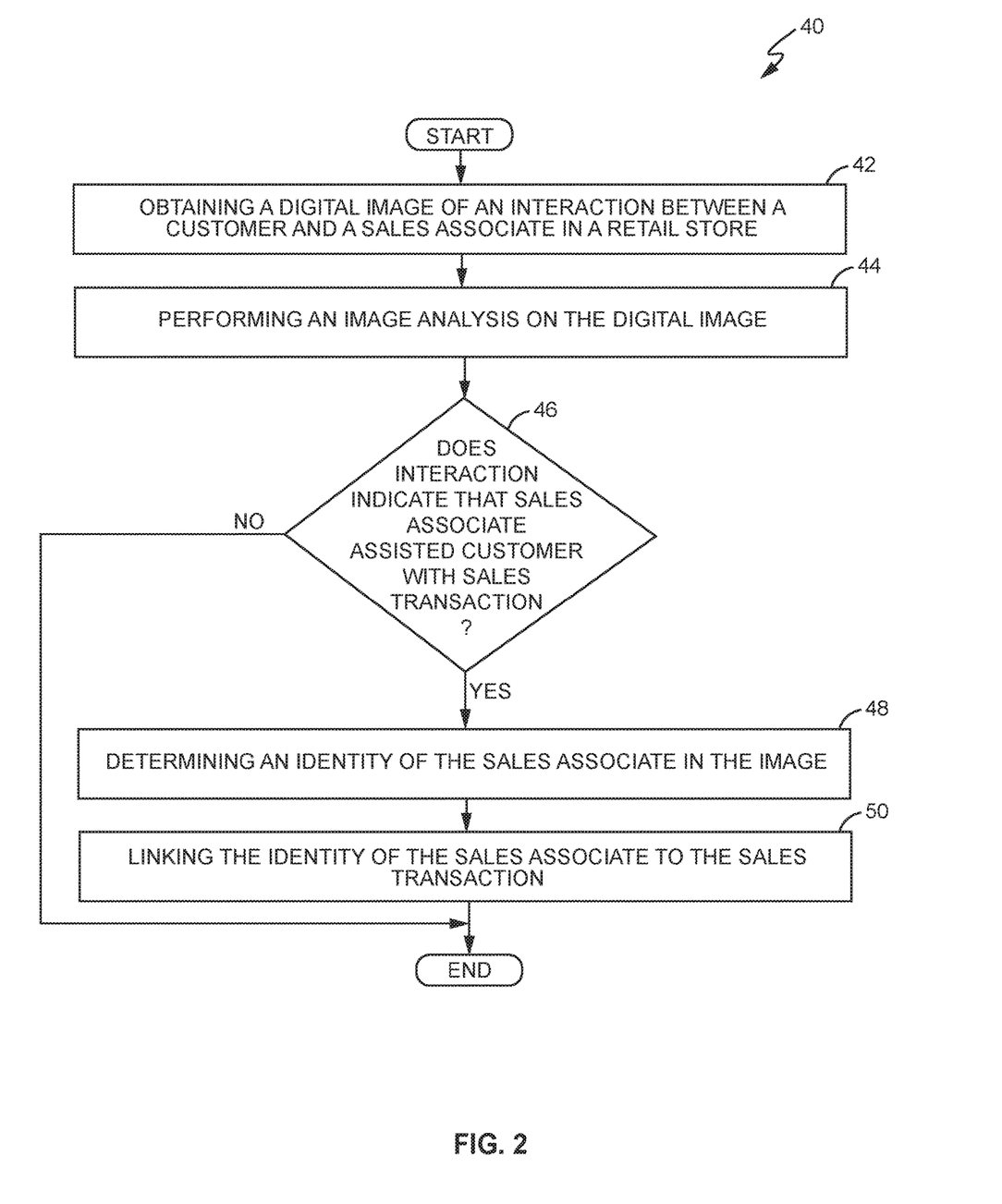
FIG. 2 is a flow diagram illustrating a method for linking the identity of a sales associate to a sales transaction according to one embodiment of the present disclosure.

FIG. 2 is a flow diagram illustrating a method 40 for linking the identity of a sales associate to a sales transaction according to one embodiment of the present disclosure. It should be noted that method 40 assumes that the cameras 18 capture images of the sales associate and the customer within the store; however, as is seen later, the present disclosure is not so limited. In other embodiments, for example, the digital images are captured by a camera that is not part of the infrastructure of the retail store, but rather, is associated with the customer or some other party.

As seen in FIG. 2, method 40 begins with obtaining a digital image of an interaction between a customer and a sales associate in the retail store (box 42). Images may be retrieved, for example, from a repository of such images on DB 32 or from some other third party server 20. In one embodiment, which is described in more detail below, the images are retrieved from one or more third-party servers 20 associated with a social media networking site such as FACEBOOK or TWITTER or INSTAGRAM. Once the digital images have been obtained, an image analysis is performed on the digital image (box 44). In one embodiment, control server 30 performs the image analysis. However, those of ordinary skill in the art should readily appreciate that the present embodiments are not so limited. In other embodiments, control server 30 is configured to generate the commands and/or messages to send the digital images via network 12 to a remote computing device specifically designed to perform image analysis, and receives the results of the analysis in return.

Regardless of whether the image analysis is performed by computer server 30, or by some other computing device, method 40 determines, based on that analysis, whether the interaction between the customer and the sales associate indicates that the sales associate assisted the customer with the sales transaction (box 46). If the interaction does not indicate that the sales associate assisted the customer, method 40 ends. However, if the interaction indicates that the sales associate assisted the customer with the sales transaction, method 40 determines the identity of the sales associate in the digital image (box 48). So identified, method 40 then links the identity of the sales associate to the sales transaction (box 50).

As stated above, the embodiment of FIG. 2 assumes, for illustrative purposes only, that the digital images of both the sales associate and the customer, and any potential interaction between them, are captured within the retail store. However, the present disclosure is not so limited. In some embodiments, such as the embodiment seen in FIG. 3, the digital image of the sales associate interacting with the customer is retrieved by control server 30 from a third party server 20 (e.g., a server for a social media site). By way of example only, using his/her smartphone, the customer may capture a digital image of the customer and the sales associate together adjacent a large item that the customer just purchased, such as a house, car, or boat, and then upload the digital image to one or more of the servers 20. As is conventional, the customer may "tag" one or more entities in the digital image. In this embodiment, the retail store, which has its own social media presence, is "tagged" in the digital image.

Figure 3:
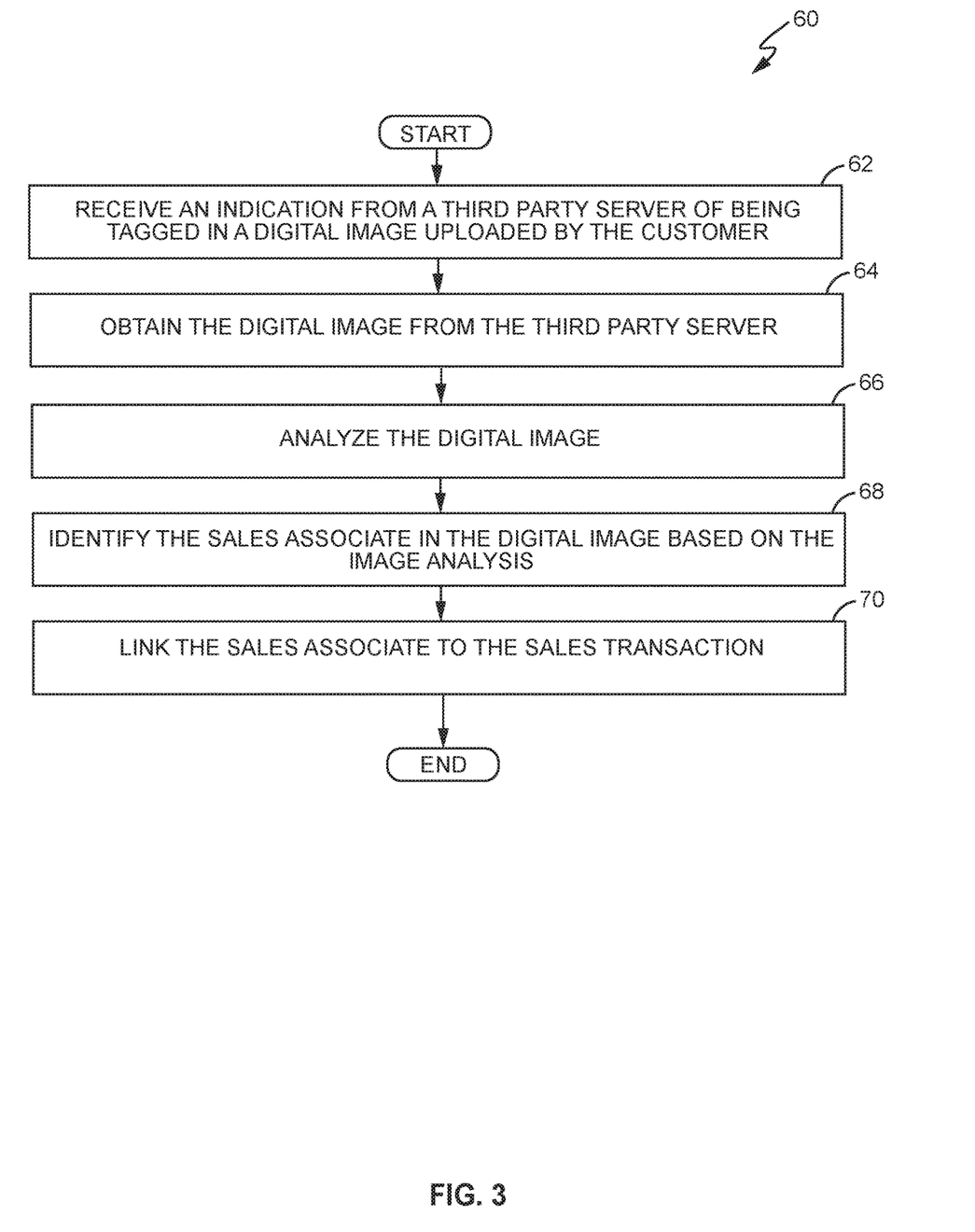
FIG. 3 is a flow diagram illustrating a method for linking the identity of a sales associate to a sales transaction according to another embodiment of the present disclosure.

Once uploaded, server 20 sends out notifications to each entity that is "tagged" in the picture. Because the retail store is "tagged," control server 30 may receive the notifications (box 62). In response, the control server 30 generates a request message to send to servers 20 requesting the digital images of the customer and the sales associate (box 64). To assist in obtaining the most relevant digital images, control server may include one or more search parameters, as previously described. Once obtained, control server 30 performs a image analysis on the digital image (box 66), as previously described, and identifies the sales associate in the digital image based on the analysis (box 68). So identified, control server 30 links the sales associate to the sales transaction (box 70).

Figure 4:
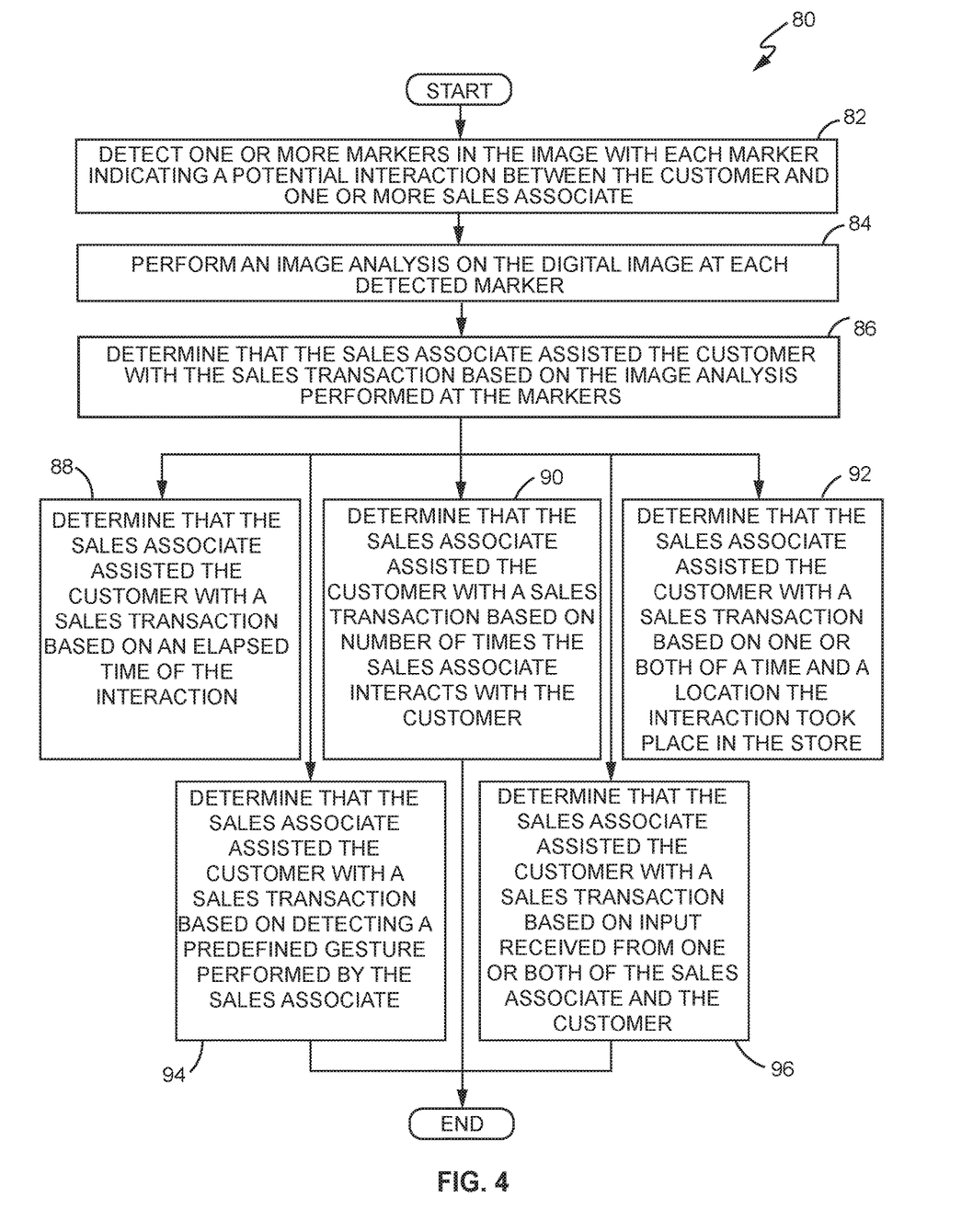
FIG. 4 is a flow diagram illustrating a method for determining that a sales associate assisted a customer with a sales transaction.

FIG. 4 is a flow diagram illustrating a method 80 for determining that a sales associate assisted a customer with a sales transaction. As seen in method 80, one or more "markers" are detected in the digital image (box 82). Each marker indicates a potential interaction between the customer and one or more sales associates. As seen later in more detail, markers may comprise "visual" cues in which a sales associate performs a predefined gesture for a camera 18 whenever he/she assists a customer. Markers may also comprise the clothing worn by a sales associate, or a badge or other item that identifies the sales associate as a store employee, a date-time stamp, or an indicator that identifies a particular section of the store the sales associate is in when assisting the customer. In some embodiments, more than one of these markers are used to indicate a potential interaction between the sales associate and the customer.

Regardless of the particular type of marker, however, the computer performing the analysis could be configured to first look for these markers to determine whether an interaction may have occurred. Method 80 then performs an image analysis on the digital image at each detected marker (box 84). Based on the analysis performed at the markers, method 80 determines whether the sales associate assisted the customer with the sales transaction (box 86).

There are a variety of ways in which method 80 can make such a determination. In one embodiment, method 80 determines that the sales associate assisted the customer with the sales transaction based on an elapsed amount of time the sales associate in the digital image is deemed to have spent with the customer (box 88). The idea is that the longer the sales associate spends with a customer, the more likely it is that the sales associate actually assisted the customer. In another embodiment, method 80 determines that the sales associate assisted the customer based on the number of times the sales associate is seen to have interacted with the customer (box 90). In other embodiments, method 80 determines that the sales associate assisted the customer based one or both of a date/time and location the interaction occurred (box 92), based on a predefined gesture performed by the sales associate and captured in the digital image (box 94), or based on user input received from the customer, the sales associate, or another store employee, for example, at POS terminal 14 (box 96).

Figure 5:
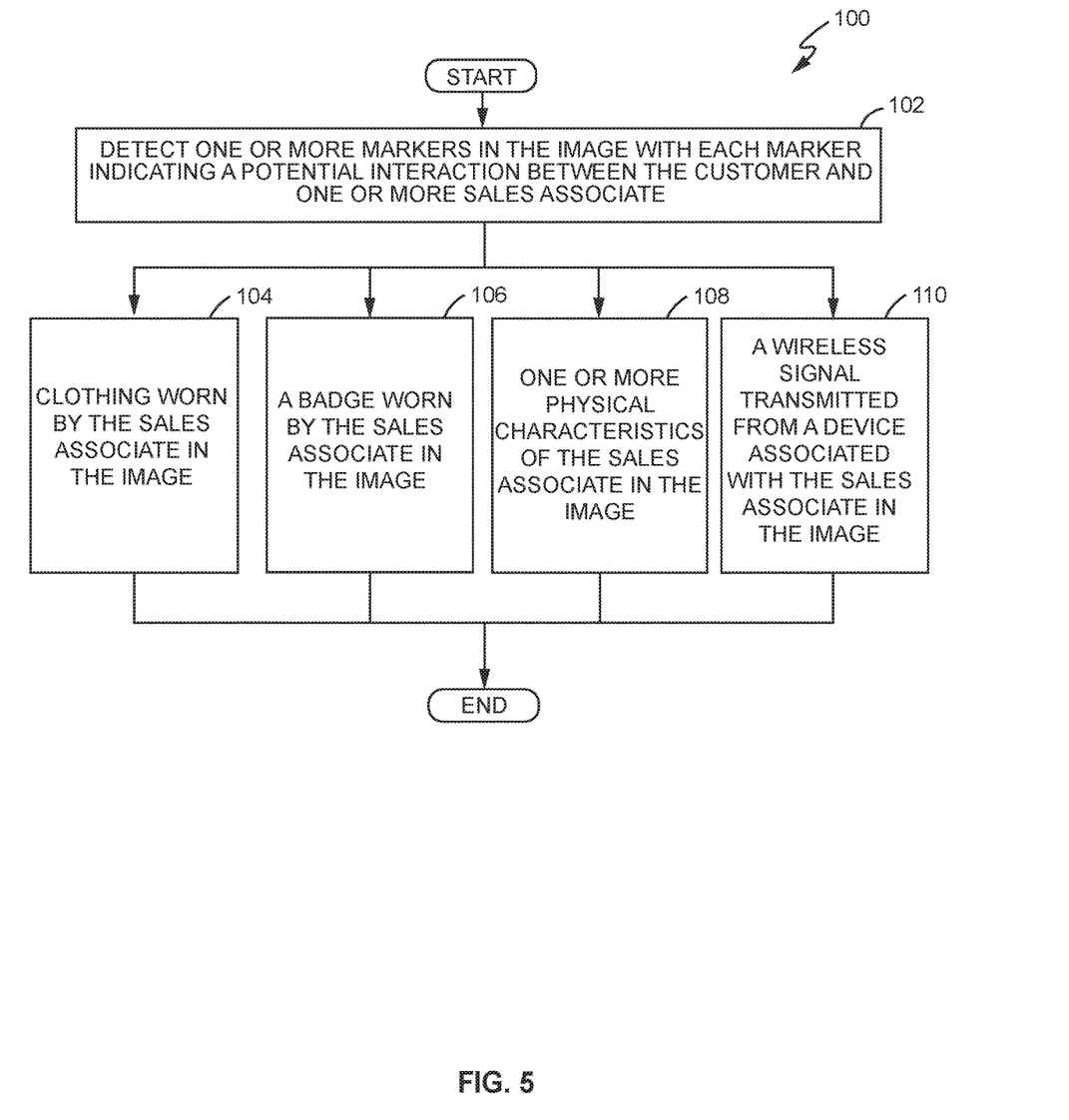
FIG. 5 is a flow diagram illustrating a method for detecting markers in a digital image according to one embodiment of the present disclosure.

FIG. 5 is a flow diagram illustrating a method 100 for detecting the markers in the captured digital images (box 102). As previously stated, the markers appear throughout the digital images with each marker indicating a potential interaction between the customer and one or more sales associates. There are various types of markers that are suitable with the embodiments of the present disclosure—some of which are seen in FIG. 5.

In one embodiment, for example, the digital analysis may detect the clothing worn by a sales associate (box 104). This embodiment takes advantage of the fact that some retail stores require their associates to wear a uniform or some other distinctive article of clothing. Therefore, the analysis could consider detecting a uniform or other distinctive article as a marker, and perform an analysis to determine whether the person detected wearing the uniform is a sales associate that assists the customer with a sales transaction.

In another embodiment, the digital analysis may detect that a person in the digital image is wearing a badge (box 106). The badge, which may be pinned to clothing or on a lanyard worn around a person's neck, for example, is also a marker. Upon detecting a badge, the image analysis could then determine whether the person wearing the badge assisted the customer with a sales transaction and indicate that interaction. Additionally, in these embodiments, the badge will typically include the name of the sales associate. Therefore, the analysis in these cases can also be configured to focus on the badge in order to determine the name of the associate thereby identifying the sales associate or associates that assisted the customer.

In another embodiment, the markers could comprise some of the physical characteristics of the sales associates in the retail store (box 108). For example, DB 32, or some other memory storage entity, could be configured to store parameter values representing the physical characteristics of the different sales associates. The parameter values could include the data used by facial recognition techniques, for example, but may also include other data as well, such as the height of the sales associates. As the digital analysis proceeds, method 100 could detect the faces of the people in the digital image and generate a set of parameter values based on the detected faces. These generated parameter values could then be compared against the known parameter values stored in memory. A match to within a certain predefined similarity threshold (e.g., a 90% match) would indicate a marker—i.e., that a sales associate is in the digital image. So detected, the image analysis could then determine whether the sales associate assisted the customer. And, because the sales associate's physical characteristics are connected to a name in DB 32, this embodiment of the present disclosure could also identify the sales associate.

In yet another embodiment, a marker could comprise a wireless signal transmitted from a device associated with the various sales associates (box 110). For example, sales associates often carry a mobile POS device 16 while they are on the floor of a retail store. Such devices are typically assigned to a particular sales associate and can, in some embodiments, be configured to transmit a signal that gets synchronized with the digital images being captured by the cameras. In one embodiment, for example, a sales associate can manually depress a button on the mobile POS device 16 responsive to being approached by a customer. This signal, which marks the point in the digital images where the sales associate assisted the customer, is received by control server 30, for example, and synchronized to a particular time in the digital images. In some embodiments, the signal may simply comprise a beacon signal that carries no information other than the fact that the sales associate caused the signal to be transmitted. In other embodiments, however, the signal comprises a message that includes various data. Such data may include, but is not limited to, a POS device 16 identifier, the current date and time indicating when the sales associate depressed the button on POS device 16, the identity of the sales associate assigned to POS device 16, the particular section or area of the store where the sales associate was located when he/she depressed the button on POS device 16, and the like.

Regardless of whether the signal does or does not contain information, though, the wireless signal marks the place in the digital image where a possible interaction between the sales associate and the customer occurred. Thereafter, the image analysis being performed on the digital images could search for these markers, and once found, determine whether an interaction took place, and if so, determine the identity of the sales associate.

Figure 6:
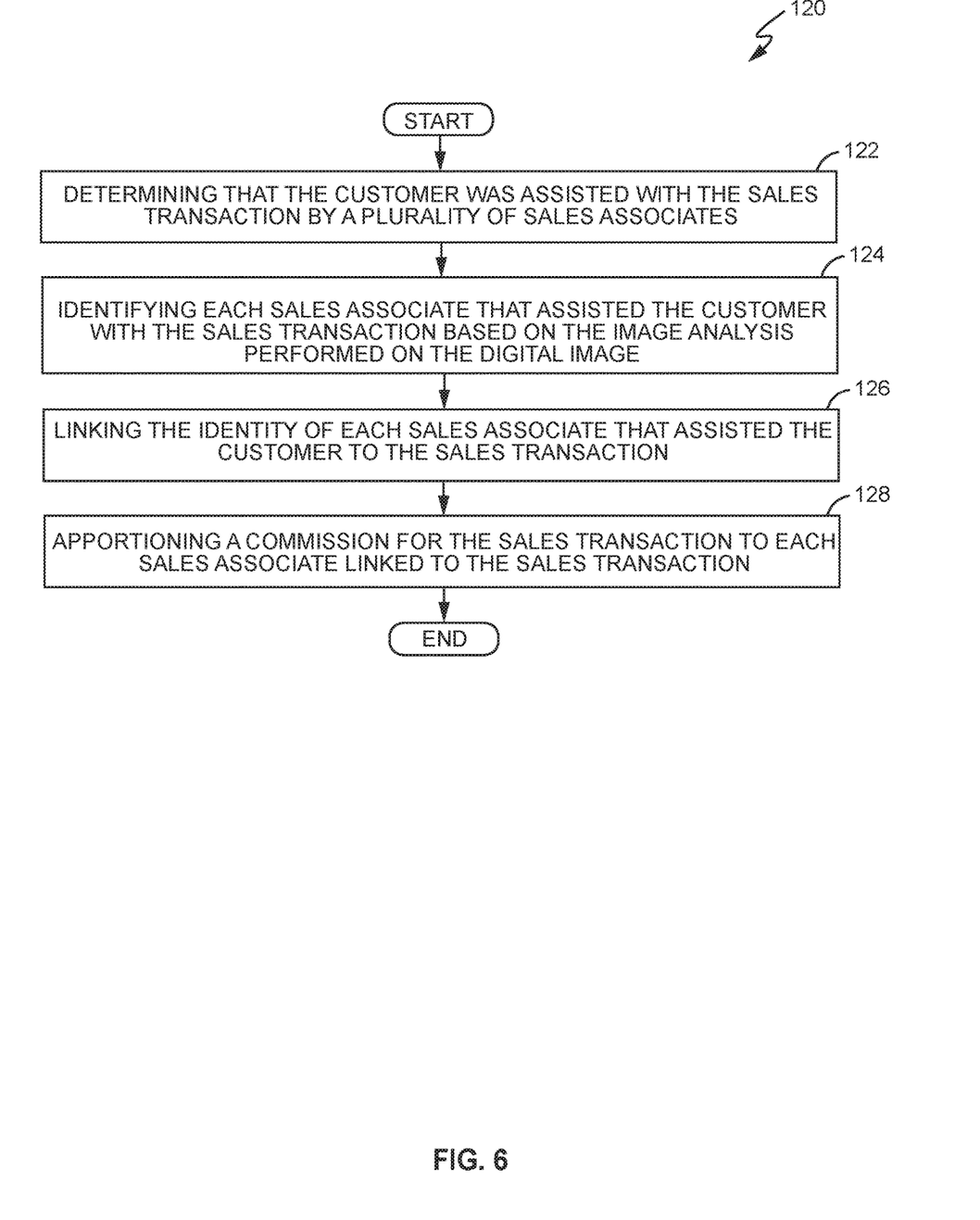
FIG. 6 is a flow diagram illustrating a method for apportioning a commission to a sales associate linked to a sales transaction according to one embodiment of the present disclosure.

The previous embodiments described how system 10 functioned to determine whether a sales associate assisted a customer with a sales transaction, as well as identifying that sales associate. So identified, the sales associate is linked to the sales transaction. However, those of ordinary skill in the art should realize that the present embodiments of the disclosure are not limited to linking only a single sales associate to the sales transaction. Rather, the present embodiments are also configured to determine whether more than one sales associate assisted the customer, and if so, identify each of those sales associates. Additionally, the present embodiments can also link each of the sales associates to the sales transaction, in in some embodiments, apportion the sales commission to each of the identified sales associates. FIG. 6 is a flow diagram illustrating one such method 120 for apportioning sales commissions according to one embodiment of the present disclosure.

As seen in FIG. 6, method 120 begins with determining that a customer was assisted by a plurality of sales associates (box 122). The plurality of sales associates could have assisted the customer with the same sales transaction (e.g., purchasing a pair of pants), or with multiple sales transactions (e.g., purchasing the pants, a shirt, and shoes). As above, those sales associates that were determined to have assisted the customer with such sales transactions are identified (box 124) and then linked to the sales transaction (box 126). Once linked, method 120 can determine the appropriate amount of commission that is due to each associate (box 128).

A computer implementing method 120 (e.g., server 30) may determine a commission percentage for each identified sales associate based on any number of factors. For example, in one embodiment, the sales associate(s) determined to have spent the most time with the customer could be allotted the largest percentage of the sales commission, while those that spent relatively little time with the customer could be allotted a smaller percentage of the sales commission. In other embodiments, a sales commission percentage could be determined for each sales associate based on the experience level of the sales associates. By way of example, a more experienced sales associates may be allotted a higher percentage of the sales commission than one of lesser experience. In other embodiments, sales commission percentages may be allotted based on the particular items purchased by the customer. Thus, a sales associate that assisted the customer with a high-value item associated with the sales transaction could be allotted a higher percentage of the sales commission than another sales associate that assisted the customer with a lower-value item in the same sales transaction.

Regardless, a computer device implementing method 120 (e.g., server 30) can be configured to both apportion and compute the sales commission based on the apportioning. In other embodiments, however, the computer implementing method 120 would simply determine how much of the sales commission each sales associate would receive, and provide that information to another device via network 12. This other device, responsive to receiving the information, would then compute the actual sales commission values based on the received apportionment information.

The previous embodiments describe aspects of the present disclosure as linking the sales associate that assisted the customer with the sales transaction when the customer finalizes the transaction. However, those of ordinary skill in the art should appreciate that this is for illustrative purposes and that the present embodiments are not so limited. In other aspects of the present disclosure, a sales associate can be linked to a particular sales transaction, or alternatively, "unlinked" from a particular sales transaction, after the sales transaction has been finalized.

For example, consider a situation where a customer returns to the store with a receipt for the sales transaction. As part of the purchase, the customer bought cereal, which is in the "cereal" section of the store. Such receipts typically include a date and time that the transaction was finalized at the cash register. A store attendant can input this information into a computer (e.g., a front-end terminal for control server 30) along with the particular section of the store. The information can then be utilized as parameters to locate the particular digital image having the interaction between a sales associate that helped the customer when he/she purchased the cereal. The digital images can then be obtained, analyzed, and the sales associate(s) identified and linked to the transaction, as previously described. In this manner, a sales associate that may not have been linked to the sales transaction when the transaction was finalized can be linked to the transaction after-the-fact. Similarly, if the customer returns an item, the analysis can identify one or more sales associates that should be removed from receiving a sales commission for that sale transaction.

Figure 7:
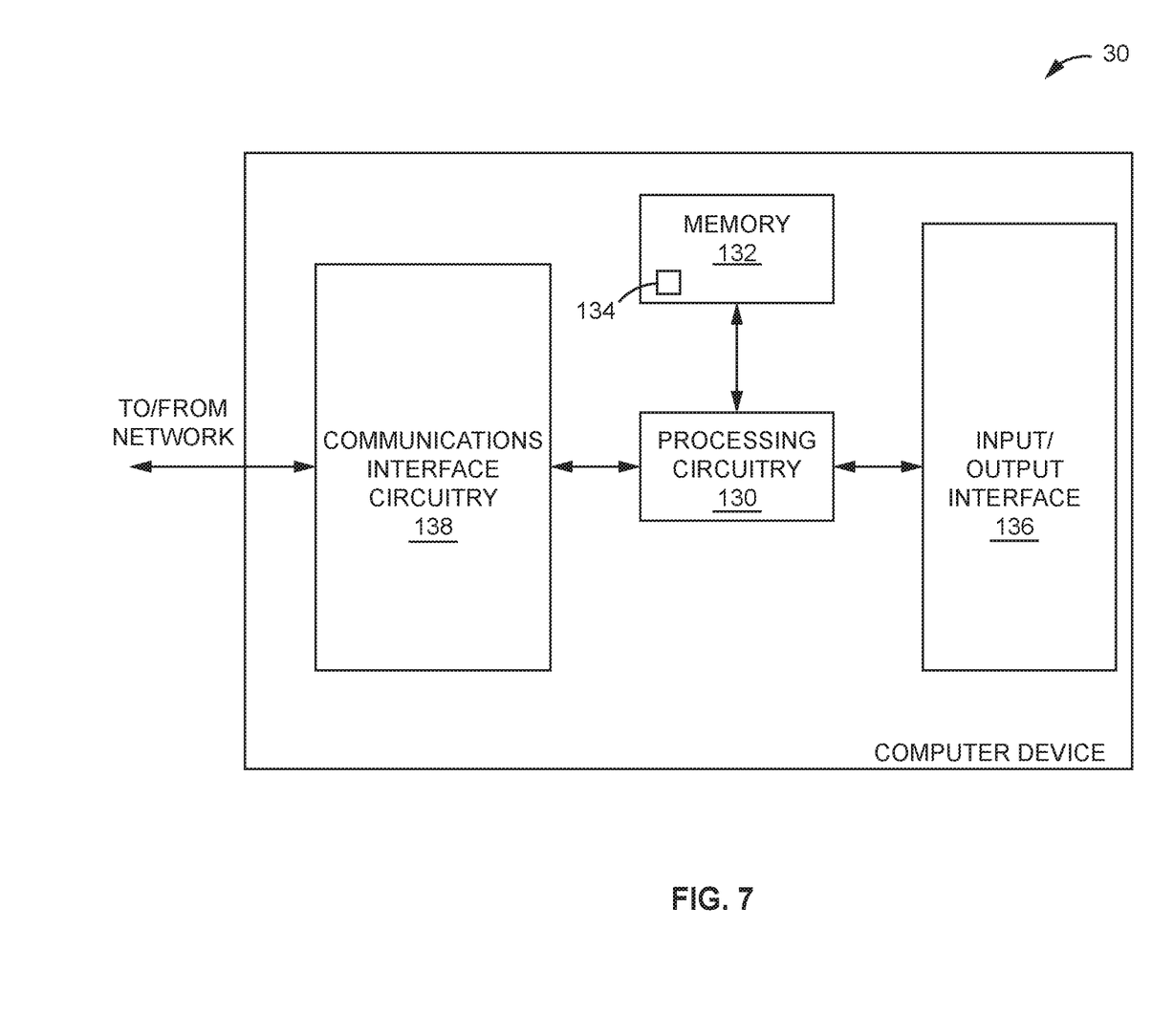
FIG. 7 is a functional block diagram illustrating a computer device configured to operate according to one embodiment of the present disclosure.

FIG. 7 is a functional block diagram illustrating a computer device (i.e., retail computer server 30) configured to operate according to one embodiment of the present disclosure. As seen in FIG. 7, server 30 comprises processing circuitry 130, a memory 132 configured to store a control application 134, user input/output (I/O) devices 136, and communications interface circuitry 138.

Processing circuitry 130, which in some embodiments may comprise a plurality of separate processor circuits, may comprise any sequential state machine operative to execute machine instructions stored as machine-readable computer programs in the memory 132, such as one or more hardware-implemented state machines (e.g., in discrete logic, FPGA, ASIC, etc.); programmable logic together with appropriate firmware; one or more stored-program, general-purpose processors, such as a microprocessor or Digital Signal Processor (DSP), together with appropriate software; or any combination of the above. Processing circuitry 130 is generally configured to control the operations and functions of server 30 according to the data and instructions stored in memory 132. This includes being controlled to perform the previously described functions in accordance with the code and logic comprising control application 134.

In particular, according to the present embodiments, processing circuitry 130 is controlled to, inter alia, obtain a digital image of an interaction between a customer and a sales associate in a retail store, determine, based on an image analysis performed on the digital image, whether the interaction indicates that the sales associate assisted the customer with a sales transaction, and responsive to determining that the interaction indicates that the sales associate assisted the customer with a sales transaction, determine an identity of the sales associate in the image and link the identity of the sales associate to the sales transaction.

The memory 132 is operatively connected to processing circuitry 130 and may comprise any non-transitory machine-readable media known in the art. Such media includes, but is not limited to, SRAM, DRAM, DDRAM, ROM, PROM, EPROM, Flash memory, and the like. In one embodiment, memory 132 comprises memory that is positioned on the inside of the server 30. In other embodiments, however, it is not. Thus, in at least some embodiments, memory 132 comprises an external database, such as DB 32, communicatively connected to the server 30.

The User I/O interface 136 comprise those devices that allow a customer or other user to interact with, and control the operation of, server 30 in accordance with the present embodiments. Such devices include, but are not limited to, display devices, including those with a touchscreen), keyboards, keypads, a mouse, and the like.

The communications interface circuitry 138 may comprise, for example, an ETHERNET interface or a wireless interface, such as a WiFi interface operating according to any of the 802.XX protocols. Communications interface circuitry 138 allows server 30 to communicate data and messages with other remote devices, such as cameras 18, mobile POS devices 16, third-party servers 20, and POS computer 14 via IP network 12 using any of a variety of well-known and well-documented protocols, such as UDP and/or TCP/IP, for example. Other communication interfaces not specifically mentioned herein are also possible.

Figure 8:
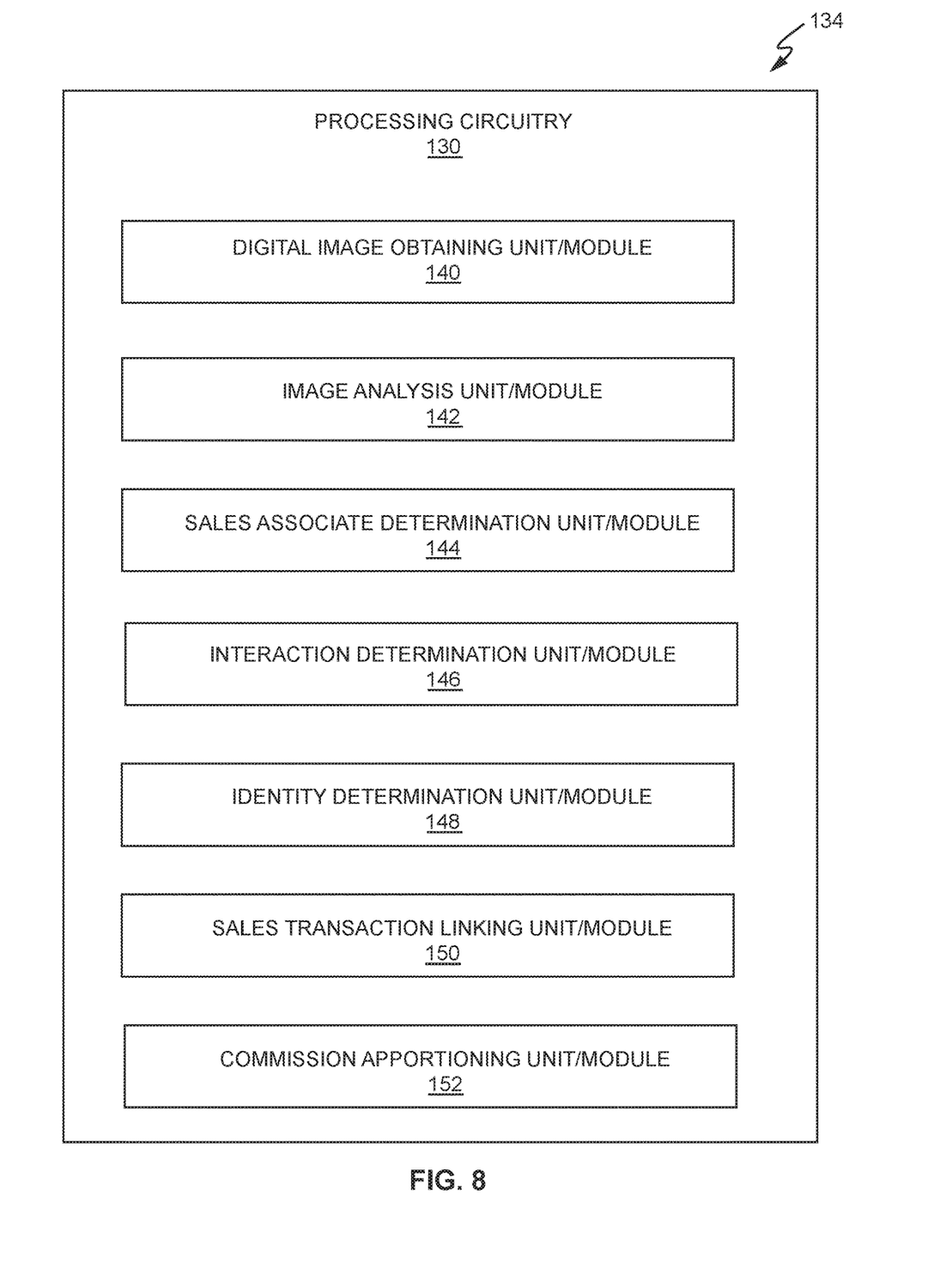
FIG. 8 is a functional block diagram illustrating a computer program product configured to control a computer to link the identity of a sales associate to a sales transaction according to one embodiment of the present disclosure.

FIG. 8 is a functional block diagram illustrating a computer program product 134 configured to control a computer to link the identity of a sales associate to a sales transaction and apportion a commission percentage to the sales associate according to one embodiment of the present disclosure.

As seen in FIG. 8, the computer program product is executed by processing circuitry 130 and comprises a digital image obtaining unit/module 140, a image analysis unit/module 142, a sales associate determination unit/module 144, an interaction determination unit/module 146, an identity determination unit/module 148, a sales transaction linking unit/module 150, and a commission apportioning unit/module 152.

In one embodiment, the digital image obtaining unit/module 140 is configured to control processing circuitry 130 to obtain the digital images from an image source. In some embodiments, the image source comprises cameras 18, while in other embodiments, the image source comprises the third-party servers 20, as previously described. The image analysis unit/module 142 is configured to perform an image analysis on the obtained digital images. In one embodiment, the image analysis unit/module 142 configures processing circuitry 130 to perform the image analysis. In other embodiments, however, the image analysis unit/module 142 configures processing circuitry 130 to generate the signals and messages necessary for sending the digital images to another computer where the image analysis is performed. In these cases, the image analysis unit/module 142 also configures processing circuitry 130 to receive the results of the image analysis.

The sales associate determination unit/module 144 configures processing circuitry 130 to determine whether the image analysis indicates that one or more sales associates are present in the digital images, while the interaction determination unit/module 146 configures processing circuitry 130 to determine whether any of the sales associates in the digital image interact with the customer. The identity determination unit/module 148 configures processing circuitry 130 to determine the identities of the sales associates deemed to have assisted the customer with the sales transaction, and the sales transaction linking unit/module 150 configures processing circuitry 130 to link those identified sales associates to the sales transaction. The commission apportioning unit/module 152 configures the processing circuitry 130 to apportion any sales commission to the sales associates that have been identified as assisting the customer with the sales transaction.

The present embodiments may, of course, be carried out in other ways than those specifically set forth herein without departing from essential characteristics of the invention. Therefore, the present embodiments are to be considered in all respects as illustrative and not restrictive, and all changes coming within the meaning and equivalency range of the appended claims are intended to be embraced therein.

What is claimed is:

1. A method of connecting sales associates to customer transactions, the method comprising:
   obtaining a digital image of an interaction between a customer and a sales associate in a retail store;
   determining, based on an image analysis performed on the digital image, whether the interaction indicates that the sales associate assisted the customer with a sales transaction;
   responsive to determining that the interaction indicates that the sales associate assisted the customer with a sales transaction:
      determining an identity of the sales associate in the image; and
      linking the identity of the sales associate to the sales transaction; and
   calculating a commission for the sales associate based on information associated with the linking.

2. The method of claim 1 wherein determining whether the interaction indicates that the sales associate assisted the customer with a sales transaction comprises:
   detecting one or more markers in the image, wherein each marker indicates a potential interaction between the customer and one or more sales associates; and
   determining that the sales associate assisted the customer with the sales transaction based on the image analysis performed on the digital image at one of the one or more markers.

3. The method of claim 1 wherein determining whether the interaction indicates that the sales associate assisted the customer with a sales transaction is based on an elapsed time of the interaction.

4. The method of claim 1 wherein determining whether the interaction indicates that the sales associate assisted the customer with a sales transaction is based a number of times the sales associate interacts with the customer.

5. The method of claim 1 wherein determining whether the interaction indicates that the sales associate assisted the customer with a sales transaction is based on one or both of a time and a location the interaction took place in the store.

6. The method of claim 5 wherein the time and location the interaction took place in the store is determined based on information obtained from a receipt for the sales transaction.

7. The method of claim 1 wherein determining whether the interaction indicates that the sales associate assisted the customer with a sales transaction comprises detecting a predefined gesture performed by the sales associate in the digital image.

8. The method of claim 1 further comprising detecting the sales associate in the image based on one or more of:
   clothing worn by the sales associate in the image;
   a badge worn by the sales associate in the image;
   one or more physical characteristics of the sales associate in the image; and
   a wireless signal transmitted from a device associated with the sales associate in the image.

9. The method of claim 1 wherein the identity of the sales associate in the digital image is determined using a facial recognition technique.

10. The method of claim 1 further comprising:
    determining that the customer was assisted with the sales transaction by a plurality of sales associates;
    wherein linking the identity of the sales associate to the sales transaction comprises linking the identity of each sales associate that assisted the customer to the sales transaction; and
    wherein calculating a commission for the sales associate based on information associated with the linking comprises apportioning the commission for the sales transaction to each sales associate linked to the sales transaction.

11. The method of claim 1 wherein obtaining a digital image of an interaction between a customer and a sales associate in a retail store comprises retrieving the digital image from a third-party server responsive to receiving an indication of being tagged in the digital image.

12. A computer for connecting sales associates to customer transactions, the computer comprising:
    communications interface circuitry configured to communicate data and information with one or more devices via a communications network; and
    processing circuitry operatively connected to the communications interface circuitry and configured to:
       obtain a digital image of an interaction between a customer and a sales associate in a retail store;
       determine, based on an image analysis performed on the digital image, whether the interaction indicates that the sales associate assisted the customer with a sales transaction;
       responsive to determining that the interaction indicates that the sales associate assisted the customer with a sales transaction:
          determine an identity of the sales associate in the image; and
          link the identity of the sales associate to the sales transaction; and
       provide information associated with the link as input to calculate a commission for the sales associate.

13. The computer of claim 12 wherein to determine whether the interaction indicates that the sales associate assisted the customer with a sales transaction, the processing circuitry is configured to:
    detect one or more markers in the image, wherein each marker indicates a potential interaction between the customer and one or more sales associates; and
    determine that the sales associate assisted the customer with the sales transaction based on the image analysis performed on the digital image at one of the one or more markers.

14. The computer of claim 12 wherein the processing circuitry is configured to determine whether the interaction indicates that the sales associate assisted the customer with a sales transaction based on an elapsed time of the interaction.

15. The computer of claim 12 wherein the processing circuitry is configured to determine whether the interaction indicates that the sales associate assisted the customer with a sales transaction based a number of times the sales associate interacts with the customer.

16. The computer of claim 12 wherein to determine whether the interaction indicates that the sales associate assisted the customer with a sales transaction, the processing circuitry is configured to detect a predefined gesture performed by the sales associate in the digital image.

17. The computer of claim 12 wherein the processing circuitry is configured to detect the sales associate in the image based on one or more of:
- clothing worn by the sales associate in the image;
- a badge worn by the sales associate in the image;
- one or more physical characteristics of the sales associate in the image; and
- a wireless signal transmitted from a device associated with the sales associate in the image.

18. The computer of claim 12 wherein the processing circuitry is further configured to:
- determine whether the customer was assisted with the sales transaction by a plurality of sales associates; and
- responsive to determining that the customer was assisted with the sales transaction by a plurality of sales associates:
  - link the identity of each sales associate that assisted the customer to the sales transaction; and
  - provide the information associated with each link as the input to apportion the commission for the sales transaction to each sales associate.

19. The computer of claim 12 wherein the processing circuitry is configured to retrieve the digital image from a third-party server responsive to receiving an indication of being tagged in the digital image.

20. A non-transitory computer-readable storage medium comprising computer program code stored thereon that, when executed by a processing circuit of a computer associated with a retail store, configures the processing circuit to:
- obtain a digital image of an interaction between a customer and a sales associate in a retail store;
- determine, based on an image analysis performed on the digital image, whether the interaction indicates that the sales associate assisted the customer with a sales transaction;
- responsive to determining that the interaction indicates that the sales associate assisted the customer with a sales transaction:
  - determine an identity of the sales associate in the image; and
  - link the identity of the sales associate to the sales transaction; and
- provide information associated with the link as input to calculate a commission for the sales associate.

* * * * *